US007395997B2

(12) United States Patent
Padden

(10) Patent No.: US 7,395,997 B2
(45) Date of Patent: Jul. 8, 2008

(54) ARTICLE HANGER

(76) Inventor: Dean J. Padden, 1830 Fountain Dr., #608, Reston, VA (US) 20190

( * ) Notice: Subject to any disclaimer, the term of this patent is extended or adjusted under 35 U.S.C. 154(b) by 106 days.

(21) Appl. No.: 11/525,162

(22) Filed: Sep. 22, 2006

(65) Prior Publication Data
US 2007/0090251 A1   Apr. 26, 2007

Related U.S. Application Data

(60) Provisional application No. 60/725,641, filed on Oct. 13, 2005.

(51) Int. Cl.
*A47H 1/16* (2006.01)
(52) U.S. Cl. .................. 248/303; 294/142; 297/188.03
(58) Field of Classification Search ............... 248/303, 248/304, 339, 215, 340, 301; 294/142, 159; 297/188.03, 188.05; 224/560, 275, 927
See application file for complete search history.

(56) References Cited

U.S. PATENT DOCUMENTS

| 1,797,381 | A | * | 3/1931 | Trimble ...................... 248/211 |
| 2,157,001 | A | | 5/1939 | Morley |
| 2,255,973 | A | | 9/1941 | Hoobler |
| 2,417,036 | A | | 3/1947 | Zelenko |
| 2,510,175 | A | | 6/1950 | Hess et al. |
| 2,947,457 | A | | 8/1960 | Lentz |
| 3,329,385 | A | | 7/1967 | Dietsch |
| 3,987,946 | A | | 10/1976 | Haglöf |
| 4,957,230 | A | | 9/1990 | Gonzales |
| 5,058,790 | A | | 10/1991 | LaVelle |
| 5,104,083 | A | | 4/1992 | Shannon |
| 5,226,569 | A | | 7/1993 | Watjer et al. |
| 5,383,588 | A | | 1/1995 | Kazel |
| 5,415,457 | A | * | 5/1995 | Kifer ...................... 297/188.04 |
| 5,419,067 | A | | 5/1995 | Drummond et al. |

(Continued)

FOREIGN PATENT DOCUMENTS

WO    WO 93/25411    12/1993

OTHER PUBLICATIONS http://www.angelfire.com/stars/mycaddy/coathanger.htm, "Back of the Seat Coat Hanger," two pages, printed from the internet on Sep. 21, 2004.

(Continued)

*Primary Examiner*—Ramon O Ramirez
(74) *Attorney, Agent, or Firm*—Richard C. Litman

(57) ABSTRACT

The article hanger is formed of a wire or rod and is configured for removable attachment to parallel posts, such as the posts supporting an adjustable height headrest above the seatback of an automobile. Each end of the device includes a multiple element clip attachable about the corresponding headrest support post, with the multiple elements precluding angular deflection of the remainder of the device and firmly attaching it to the posts. An arm extends from each attachment clip, with a spring coil loop formed in each arm to allow the two clips to be deflected for installation and removal. An article support hook is formed medially in the wire or rod, between the two spring coils. The device may be coated with a resilient or nonabrasive material to preclude metal-to-metal contact between the device and the headrest support rods, and/or other metal components.

18 Claims, 4 Drawing Sheets

U.S. PATENT DOCUMENTS

| | | |
|---|---|---|
| D414,635 S | 10/1999 | Richter |
| 6,220,489 B1 | 4/2001 | Sato |
| 6,260,750 B1 | 7/2001 | Chiang |
| 6,443,523 B1 | 9/2002 | Reitze |
| 6,502,900 B1 * | 1/2003 | Johnston ................ 297/188.06 |
| 6,651,941 B1 | 11/2003 | Kinsel |
| 2003/0121943 A1 | 7/2003 | Chou |

OTHER PUBLICATIONS http://www.smbros.gr/HOME/skoda/superb/Iinterior.htm, "Car Coat Hanger," one page, printed from the internet on Sep. 21, 2004.

* cited by examiner

ARTICLE HANGER

CROSS-REFERENCE TO RELATED APPLICATION

This application claims the benefit of U.S. Provisional Patent Application Ser. No. 60/725,641, filed Oct. 13, 2005.

BACKGROUND OF THE INVENTION

1. Field of the Invention

The present invention relates generally to portable, removably installable brackets and the like for removably suspending various articles therefrom. In a particularly preferred embodiment, the present invention relates to an article hanger adapted for attachment to the headrest of a motor vehicle, and that is adapted to support a clothes hanger or the like.

2. Description of the Related Art

Interior space is often at a premium in many automobiles, particularly in the case of smaller automobiles and sports cars. While all such cars have at least some trunk space, there is no provision for hanging articles (e.g., dry cleaning or suit bags, etc.) within the interior of many cars. The alternative is to place them in the trunk, where they often must be folded to fit in smaller trunks. This often results in undesired creases and wrinkles in the article of clothing by the time it can be removed for proper storage or for wearing.

Other problems exist when using a conventional automobile trunk for storage, particularly in the case of larger cars. Oftentimes, small purchases are made, e.g., one or two small grocery bags of goods, with the bags being placed in the trunk for carriage home. Generally, the volume within even smaller automobile trunks will allow the goods to slide about and spill from their bags during transport, thus resulting in the additional chore of repacking the goods within the bags in order to remove them from the trunk of the car.

As a result, various devices have been developed in the past for supporting or suspending articles within the interior of an automobile. Most such devices are configured for permanent installation in the vehicle and require some modification to the interior of the car for installation. Many, if not most, automobile owners are reluctant to install such permanent devices, as modification to the interior of the vehicle may result in lowering the value of the car. Such modifications are generally prohibited for persons leasing their automobiles.

Certain other portable and removably installable devices have been developed, but these are often affixed to a rear door frame, rear side glass, or other rearward area of a multiple seat passenger area in a larger automobile. Such devices cannot be used in many small cars, and tend to obstruct outward visibility in any case. Still other devices have been developed which attach to the back of one of the front seats of the car, with such devices generally being usable in smaller, two seat cars. However, most such devices are relatively bulky and cumbersome, with relatively broad shoulder supports for hanging coats and the like therefrom, and/or other relatively large panels and/or components bracing against the seatback or other structure. The few relatively compact wire form devices that have been developed are not configured to receive the hook of a clothes hanger, grocery bag handle loop, or the like.

Thus, an article hanger solving the aforementioned problems is desired.

SUMMARY OF THE INVENTION

The article hanger comprises a single, monolithic length of wire or rod that is bent and formed in such a manner that the article hanger may be removably attached to the conventional posts supporting an adjustable height headrest to the seatback of an automobile, or other similar support having two parallel rods or posts. Each end of the device includes a multiple element clip, which engages the corresponding headrest support post, with the multiple elements precluding angular deflection of the remainder of the device and rigidly attaching the device to the posts. An arm extends from each attachment clip, with a spring coil loop formed in each arm to allow the two clips to be deflected for installation and removal. An article support hook is formed medially in the wire or rod, between the two spring coils. The device may be coated with a resilient material or a nonabrasive plastic or other coating in order to preclude metal-to-metal contact between the device and the headrest support posts and/or other metal components.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
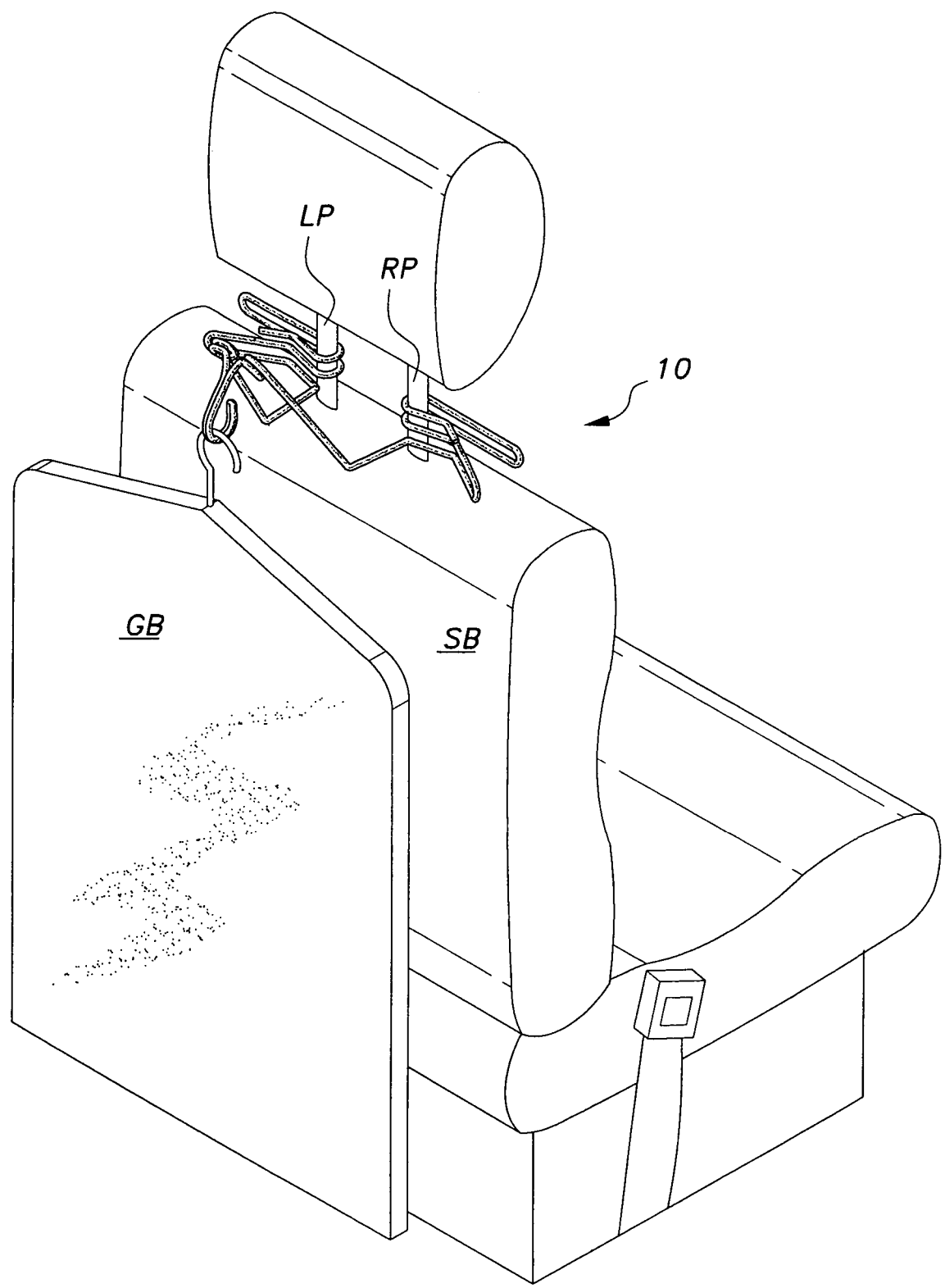
FIG. 1 is an environmental, perspective view of an article hanger according to the present invention, shown installed upon the headrest support posts of a vehicle seatback.

The present invention comprises an article hanger. In a preferred embodiment, the article hanger removably attaches to and is supported by the conventional headrest support posts of a vehicle seatback. FIG. 1 of the drawings provides a general environmental rear perspective view of the article hanger 10, showing it attached to the left and right headrest support posts LP and RP of a vehicle seatback SB and supporting a garment bag GB. The device is formed of a single, monolithic length of heavy gauge wire or rod, but includes sufficient resilience to allow it to be flexed or sprung to install its attachment clips upon the headrest posts or to remove the device from the posts. The term "monolithic" as used herein, also includes such a device formed of two or more lengths of wire or rod, with the lengths being welded together end-to-end during manufacture to produce a device essentially structurally comprising a single, monolithic unit.

Figure 2:
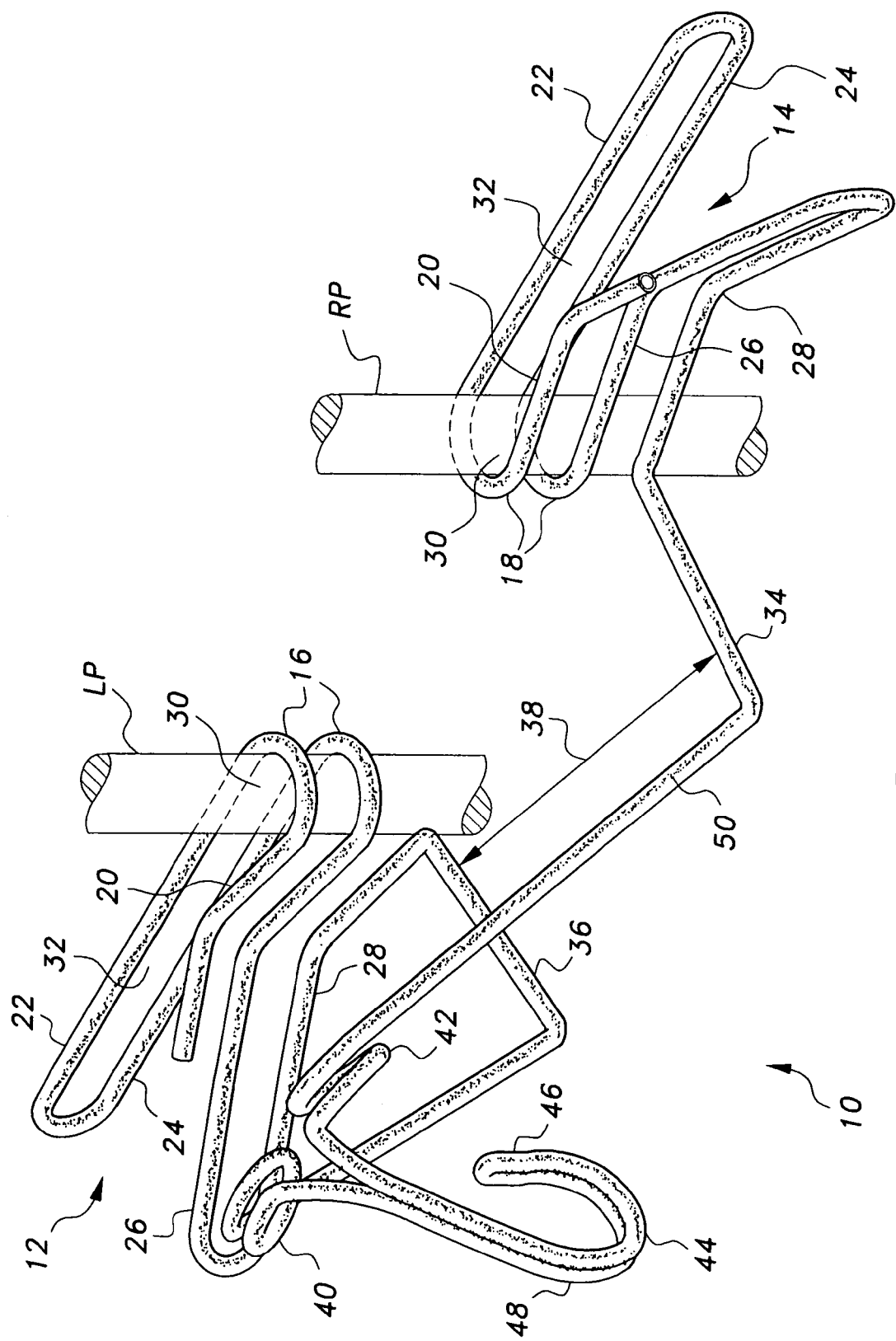
FIG. 2 is a detailed rear perspective view of the article hanger of the present invention, showing further details thereof and its installation upon a pair of broken away headrest support posts.

FIG. 2 of the drawings is a detailed rear perspective view of the hanger 10, more clearly showing the details of its various features. The monolithic rod of which the hanger 10 is formed includes opposite first and second end portions 12 and 14, which are bent to form the respective headrest support post attachment clips 16 and 18. Each clip 16 and 18 includes multiple gripping elements that serve to secure the hanger 10 rigidly to the posts LP and RP and preclude undue movement of the hanger 10 relative to the posts when installed thereon. The gripping elements 16 and 18 are mirror images of one another, each comprising an elongate, generally U-shaped upper clip portion having a single post rear contact member 20 that bends around the post when installed thereon and continues to the post upper forward contact member 22, which member 22 bends downwardly to double back and form the post lower forward contact member 24.

Figure 4:
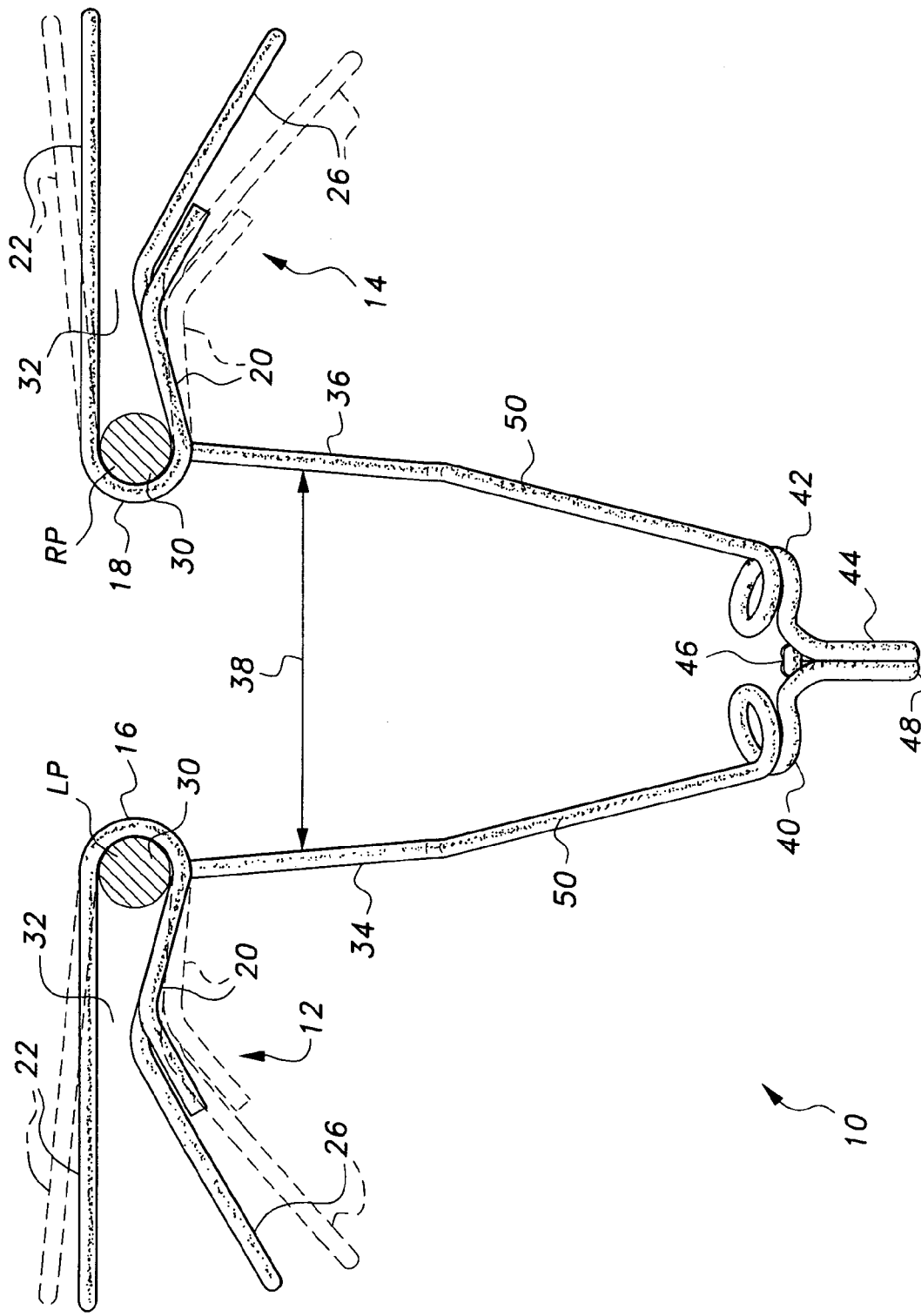
FIG. 4 is a detailed top plan view of the article hanger of the present invention, showing the spreading of the spring clips for installation or removal of the device upon or from the headrest support posts.

Each lower forward contact member 24 continues in a sinusoidal bend to its respective lower clip portion having a first rearward post contact member 26, which bends back to form the second rearward post contact member 28 therebelow. This configuration provides a series of two elements or fingers, which bear against the forward portion of each post, i.e., forward elements 22 and 24, and three rearward elements, i.e., elements 20, 26, and 28, which bear against the rearward portion of each post. As the lower forward element 24 is disposed between the upper rearward element 20 and the lowermost rear element 28 along the post when the hanger 10 is installed, the device cannot rock forwardly or rearwardly relative to the two headrest posts LP and RP, as would be the case with a simpler attachment structure having fewer elements. It will be noted in the top plan view of FIG. 4 of the drawings that the various elements or fingers of the post gripping portions of each of the clips 16 and 18 respectively define a headrest support post gripping passage 30 therebetween, with an outwardly oriented throat 32 therebetween which is narrower than the gripping passage 30. This is shown clearly in FIG. 4, as the various front and rear gripping elements 20 through 28 must be sprung away from one another, as shown in broken lines, in order to allow the gripping portions of the device to pass around the respective headrest support posts. Once installed, the grip elements spring back to their natural configuration, gripping the headrest posts securely therein.

Each of the gripping portions 16 and 18 of the hanger device 10 includes an arm, respectively left arm 34 and right arm 36, extending from the respective lowermost rearward post contact member 28. The lower portions of the two arms, i.e., the portions extending immediately from the two gripping portions 16 and 18, define a span 38 therebetween, with the span 38 being approximately equal to (or slightly greater than) the span between the two headrest support posts LP and RP. This span 38 may be adjusted at the time of manufacture of the hanger 10, or adjusted by the user of the device, to fit specific headrest post configurations.

The two arms 34 and 36 continue upwardly and outwardly away from their respective headrest support post grips 16 and 18, with each of the arms having a spring coil loop, respectively 40 and 42, preferably helical, formed near the common distal portion thereof. These spring coil loops 40 and 42 allow the user of the device 10 to spring the two gripping members 16 and 18 together in order to position their open ends between the two headrest support posts LP and RP, as shown in broken lines in FIG. 3 (the device may be moved laterally for greater clearance for each grip separately, rather than being positioned centrally between the two posts, as shown in FIG. 3), with the spring tension urging the two gripping members 16 and 18 apart to retain their hold on the two headrest posts when the device is installed thereon, as shown in solid lines in FIG. 3.

The mirror image left and right portions of the hanger 10 have a common distal portion that forms a centrally disposed article support hook 44. The hook 44 is preferably oriented with its open portion and tip 46 facing inwardly, i.e., toward the span 38 between the two headrest support post attachment clips 16 and 18, with a smoothly curved and contoured back portion 48 oriented outwardly away from the two arms 34 and 36. This arrangement provides greater safety in the event the device is installed in a vehicle with rear seats, as the hook tip 46 does not face toward any rear seat passenger riding behind the device.

Figure 3:
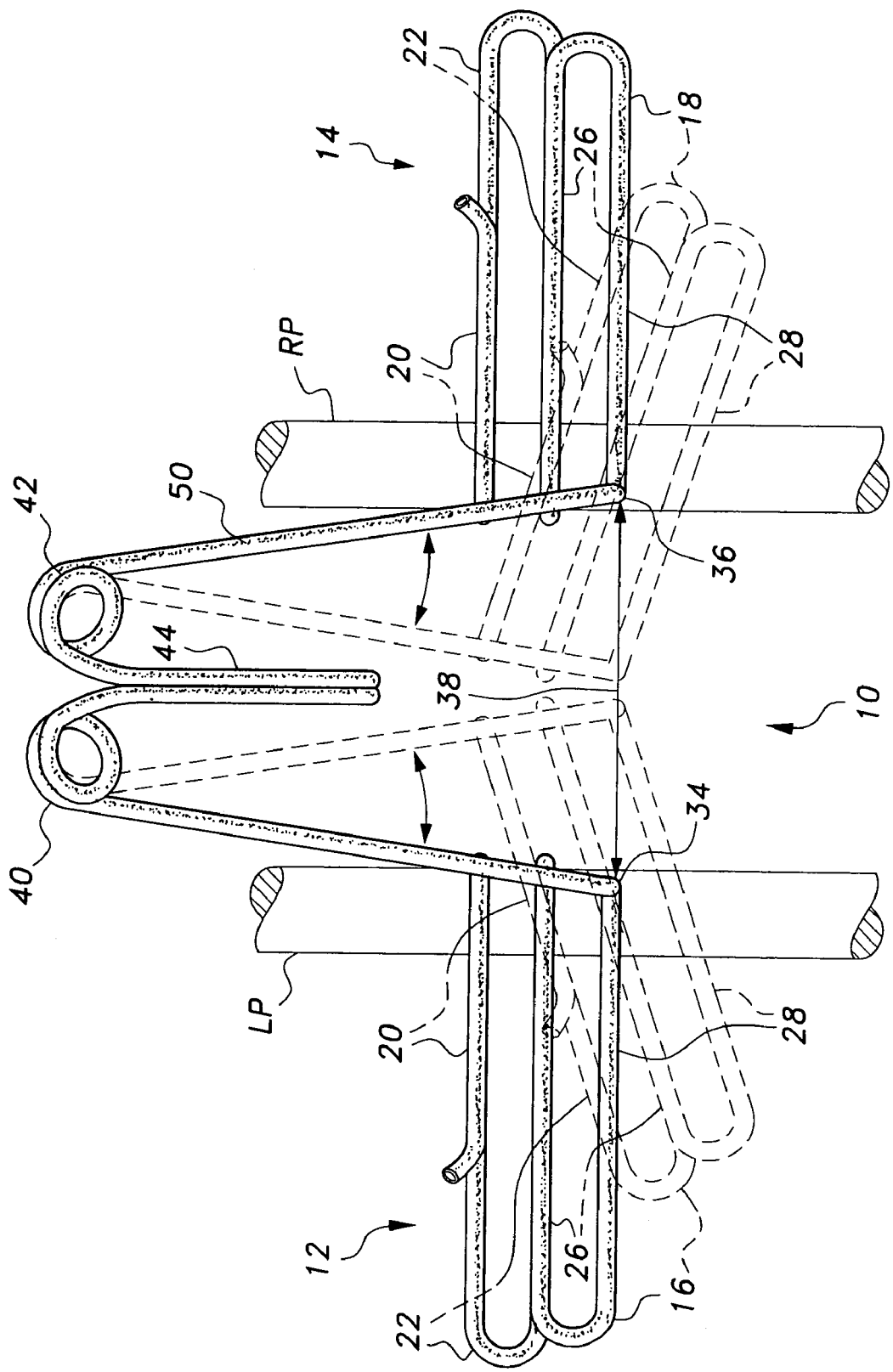
FIG. 3 is a detailed rear elevation view of the article hanger of the present invention, showing the inward deflection of the two arms in broken lines for the installation or removal of the device upon or from the headrest support posts.

The article hanger 10 is secured to the two headrest posts LP and RP of a vehicle seatback by squeezing the two headrest post grips 16 and 18 together, generally as shown in FIG. 3 of the drawings, and allowing the two post grip members 16 and 18 to spring outwardly to grip the respective headrest support posts therebetween. The device is preferably formed of a heavy wire or rod made of spring steel, thus allowing it to be resiliently deformed for installation and removal from the headrest support posts. Preferably, the spring steel wire or rod is coated with a non-metallic material 50, e.g., a relatively thin, nonabrasive plastic or rubberized coating or sleeve, as shown by the surface coating representation in the various drawings. Most preferably, the entire device is provided with such a coating, although only the two gripping portions 16 and 18 may be coated to reduce manufacturing costs. This provides greater friction between the post grip portions 16 and 18 of the device and the two headrest support posts LP and RP in order to resist slippage of the device when installed. The use of such a non-metallic coating 50 also precludes metal-to-metal contact between the steel rod or wire of the device and the metal headrest support posts, thus eliminating any rattle or noise producing vibrations between the device and the headrest posts.

Although shown in use with the posts supporting a vehicle headrest, the article hanger 10 may be attached to any two parallel posts or rods, and may be used to support clothes hangers or other devices having hooks, bag handles (e.g., plastic grocery or shopping bags), or any other articles that may be hung from a hook. Although described as being formed from a single monolithic wire, the article hanger 10 may alternatively be formed from a plurality of discrete components, e.g., a single wire forming the clips 16 and 18, arms 34 and 36, and spring coil loops 40 and 42 joined together at their ends and having a discrete hook attached to the single wire between the two coil loops 40 and 42; two separate wire portions, each wire forming a single one of the clips, arms, and loops, and a discrete hook joining the two wires together between the loops; etc.

In conclusion, the article hanger provides an economical means for vehicle owners and drivers to hang various articles, rather than placing those articles in the vehicle trunk or other storage area. While the wire or rod from which the article hanger is formed is shown throughout the drawings as having a round cross section, it will be appreciated that the device is not limited to such a cross section, but may be formed of wire or rod having any practicable cross section, circular or otherwise, e.g. square, oval, rectangular, etc., as desired. While the article hanger is particularly well suited for use in holding dry cleaning garment bags, suit bags, articles of clothing on hangers, and similar articles, it is also well suited for holding grocery bags and virtually any other practicable article having a hanging loop, eye, or hook. The article hanger is particularly useful in relatively small two seat cars and other vehicles having limited interior space, but may also be used in larger vehicles as well. The economy and utility of the article hanger will prove to be most useful to many vehicle operators, for a multitude of applications and uses.

It is to be understood that the present invention is not limited to the embodiment described above, but encompasses any and all embodiments within the scope of the following claims.

I claim:

1. An article hanger, comprising a single monolithic rod having opposed first and second end portions, the rod being shaped to have:
   a headrest support post attachment clip formed of each of the end portions, each of the clips having multiple opposed gripping elements adapted for removably securing each of the end portions to a corresponding support post when attached thereto;
   an article support arm extending from each the clips, the arms defining a span therebetween and having a distal portion; and
   an article support hook formed from the distal portion of the support arms, the hook joining the distal portions.

2. The article hanger according to claim 1, further including a spring coil loop formed in each said arm.

3. The article hanger according to claim 1, wherein said article support hook has:
   a closed, smoothly curved back portion facing generally away from each said arm; and
   an inwardly oriented hook tip facing the span between each said attachment clip.

4. The article hanger according to claim 1, wherein the multiple gripping elements of each clip comprise:
   an elongate, generally U-shaped upper clip portion having first and second post forward contact members and a single post rear contact member; and
   an elongate, generally U-shaped lower clip portion having first and second post rear contact members, the post forward contact members and the post rear contact members defining a headrest support post gripping passage and a throat therebetween, the throat being narrower than the post gripping passage.

5. The article hanger according to claim 1, wherein said rod is formed of spring steel.

6. The article hanger according to claim 1, further including a non-metallic coating disposed over at least a portion of said rod.

7. An article hanger, comprising a single, monolithic rod having opposed first and second end portions, the rod being shaped to have:
   a support post attachment clip formed from each of the end portions;
   an article support arm extending from each of the clips, the arms defining a span therebetween;
   a spring coil loop formed in each of the arms opposite the clips; and
   an article support hook formed in the rod between the loops.

8. The article hanger according to claim 7, wherein each clip further includes multiple opposed gripping elements selectively securing each of said end portions to a corresponding headrest support post rigidly when attached thereto.

9. The article hanger according to claim 7, wherein said article support hook has:
   a closed, smoothly curved back portion facing generally away from each said arm; and
   an inwardly oriented hook tip facing the span between each said attachment clip.

10. The article hanger according to claim 7, wherein the multiple gripping elements of each clip comprise:
    an elongate, generally U-shaped upper clip portion having first and second post forward contact members and a single post rear contact member; and
    an elongate, generally U-shaped lower clip portion having first and second post rear contact members, said post forward contact members and said post rear contact members defining a headrest support post gripping passage and a throat therebetween, the throat being narrower than the post gripping passage.

11. The article hanger according to claim 7, wherein said rod is formed of spring steel.

12. The article hanger according to claim 7, further including a non-metallic coating disposed over at least a portion of said rod.

13. An article hanger, comprising:
    a pair of support post attachment clips formed from wire, each of the clips being adapted for resiliently gripping a post;
    a pair of article support arms, the article support arms extending from the clips and defining a span therebetween, each of the arms being formed from wire and having a distal portion formed into a helical spring loop opposite the clip, the spring loops biasing the clips away from each other; and
    a hook joining the two spring loops together, the arms offsetting the hook from the clips so that the arms and spring loops form a generally U-shaped structure, the hook forming a bight of the U-shape and opening towards the clips.

14. The article hanger according to claim 13, wherein each clip further includes multiple opposed gripping elements selectively securing each of said end portions to a corresponding headrest support post rigidly when attached thereto.

15. The article hanger according to claim 13, further including a spring coil loop formed in each said arm.

16. The article hanger according to claim 13, wherein the multiple gripping elements of each clip comprise:
    an elongate, generally U-shaped upper clip portion having first and second post forward contact members and a single post rear contact member; and
    an elongate, generally U-shaped lower clip portion having first and second post rear contact members, said post forward contact members and said post rear contact members defining a headrest support post gripping passage and a throat therebetween, the throat being narrower than the post gripping passage.

17. The article hanger according to claim 13, wherein said rod is formed of spring steel.

18. The article hanger according to claim 13, further including a non-metallic coating disposed over at least a portion of said rod.

* * * * *